(12) United States Patent
Errickson et al.

(10) Patent No.: US 7,581,021 B2
(45) Date of Patent: Aug. 25, 2009

(54) SYSTEM AND METHOD FOR PROVIDING MULTIPLE VIRTUAL HOST CHANNEL ADAPTERS USING VIRTUAL SWITCHES

(75) Inventors: Richard K. Errickson, Poughkeepsie, NY (US); David Craddock, New Paltz, NY (US); Thomas A. Gregg, Highland, NY (US); Donald W. Schmidt, Stone Ridge, NY (US); Jeffrey M. Turner, Poughkeepsie, NY (US); Bruce M. Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 837 days.

(21) Appl. No.: 11/100,846

(22) Filed: Apr. 7, 2005

(65) Prior Publication Data
US 2006/0230185 A1    Oct. 12, 2006

(51) Int. Cl.
*G06F 15/173* (2006.01)
(52) U.S. Cl. .................. 709/238; 340/825; 710/316
(58) Field of Classification Search .............. 709/238
See application file for complete search history.

(56) References Cited

U.S. PATENT DOCUMENTS

| | | | |
|---|---|---|---|
| 6,480,500 B1* | 11/2002 | Erimli et al. ............. 370/412 |
| 6,622,193 B1 | 9/2003 | Avery | |
| 6,718,370 B1 | 4/2004 | Coffman et al. | |
| 6,760,783 B1 | 7/2004 | Berry | |
| 6,963,932 B2* | 11/2005 | Bhat ........................ 709/249 |
| 2002/0141424 A1 | 10/2002 | Gasbarro et al. | |
| 2002/0144001 A1 | 10/2002 | Collins et al. | |
| 2003/0005039 A1* | 1/2003 | Craddock et al. ......... 709/203 |
| 2003/0031183 A1* | 2/2003 | Kashyap et al. ......... 370/395.2 |
| 2003/0035433 A1* | 2/2003 | Craddock et al. ......... 370/429 |
| 2003/0061379 A1* | 3/2003 | Craddock et al. ......... 709/238 |
| 2003/0065856 A1 | 4/2003 | Kagan et al. | |
| 2003/0084241 A1 | 5/2003 | Lubbers et al. | |
| 2003/0101158 A1* | 5/2003 | Pinto et al. ................... 707/1 |
| 2003/0200315 A1* | 10/2003 | Goldenberg et al. ....... 709/225 |
| 2003/0204618 A1* | 10/2003 | Foster et al. ................ 709/238 |
| 2004/0003141 A1* | 1/2004 | Matters et al. ................ 710/1 |
| 2004/0024903 A1* | 2/2004 | Costatino et al. ........... 709/238 |
| 2004/0028043 A1 | 2/2004 | Maveli et al. | |
| 2004/0030745 A1 | 2/2004 | Boucher et al. | |
| 2004/0049580 A1* | 3/2004 | Boyd et al. ................. 709/226 |
| 2004/0139240 A1 | 7/2004 | DiCorpo et al. | |

(Continued)

*Primary Examiner*—Bunjob Jaroenchonwanit
*Assistant Examiner*—Eric W Shepperd
(74) *Attorney, Agent, or Firm*—Arthur Ortega; Daryl K. Neff

(57) ABSTRACT

A processor node of a network is provided which includes one or more processors and a virtualized channel adapter. The virtualized channel adapter is operable to reference a table to determine whether a destination of the communication is supported by the virtualized channel adapter. When the destination is supported for routing via hardware, the virtualized channel adapter is operable to route the communication via hardware to at least one of a physical port and a logical port of the virtualized channel adapter. Otherwise, when the destination is not supported for routing via hardware, the virtualized channel adapter is operable to route the communication via firmware to a virtual port of the virtualized channel adapter. A corresponding method and a recording medium having information recorded thereon for performing such method are also provided herein.

17 Claims, 6 Drawing Sheets

U.S. PATENT DOCUMENTS

2004/0202189 A1* 10/2004 Arndt et al. ................. 370/409
2004/0215848 A1 10/2004 Craddock et al.
2006/0004795 A1* 1/2006 Shah et al. ................. 707/100

* cited by examiner

SYSTEM AND METHOD FOR PROVIDING MULTIPLE VIRTUAL HOST CHANNEL ADAPTERS USING VIRTUAL SWITCHES

BACKGROUND OF THE INVENTION

The present invention relates to information processing systems and data communications systems, especially data communications interfaces of information processing systems.

The present invention is directed to an improved data processing system. More specifically, the present invention provides a system and method for providing multiple virtual host channel adapters using virtual switches within a physical channel adapter of a system area network.

In a system area network ("SAN"), such as a network in accordance with InfiniBand architecture ("IBA"), the hardware provides a message passing mechanism that can be used for input/output devices ("I/O") and interprocess communications ("IPC") between general computing nodes. Processes executing on devices access SAN message passing hardware by posting send/receive messages to send/receive work queues on a SAN host channel adapter ("HCA"). These processes are also referred to as "consumers."

The send/receive work queues ("WQ") are assigned to a consumer as a queue pair ("QP"). Consumers retrieve the results of these messages from a completion queue ("CQ") through SAN send and receive work completion ("WC") queues. The source channel adapter takes care of segmenting outbound messages and sending them to the destination. The destination channel adapter takes care of reassembling inbound messages and placing them in the memory space designated by the destination's consumer.

Two channel adapter types are present in nodes of the SAN fabric, a host channel adapter ("HCA") and a target channel adapter ("TCA"). The host channel adapter is used by general purpose computing nodes to access the SAN fabric. Consumers use SAN verbs to access host channel adapter functions. Target channel adapters (TCA) are used by nodes that are the subject of messages sent from host channel adapters. The target channel adapters serve a similar function as that of the host channel adapters in providing the target node an access point to the SAN fabric.

The processing power and connectivity of medium and large scale computing systems, frequently referred to as servers or "mainframes", have recently experienced rapid increases. These improvements have been accompanied by improvements in the flexibility with which they can be programmed and used. Often it is beneficial to logically partition individual components and resources within such computing systems so as to support a plurality of operating system environments. Such logical partitioning allows each operating system, and applications operating within that operating system environment, to view the resources of the system as being dedicated to that operating system environment even though, in actuality, the resources are shared by a plurality of operating system environments. Such logical partitioning allows a system to support multiple different environments and thus, increases the versatility of the system while reducing the cost of maintaining the different environments by sharing of resources.

Building, operating and maintaining a large number of individual small scale computing systems, e.g., personal computers or "PCs" or even doing the same for mid-size computing systems involve significant costs in administering changes and updates to the hardware, operating systems, as well as administering changes and updates to applications which they support. These factors make the total cost of owning and operating such small- and mid-scale computing systems significant.

As the scale of server computer systems increases, it is desirable to further increase the flexibility of uses to which such systems can be put, by enabling support for a larger number of logical partitions on a single processor node of a SAN. A larger number of logical partitions will support a corresponding larger number of operating system images. Each operating system image, in turn, can support an environment tailored to the needs of a particular customer who uses the logical partition. Therefore, by providing facilities for creating and maintaining larger numbers of logical partitions, greater flexibility is provided such that the server computer can be shared among a great number of customers or customer uses when desired. Enabling larger numbers of logical partitions to be supported by one server helps assure that the processor resources and input/output resources of a server are best utilized.

SUMMARY OF THE INVENTION

In accordance with one aspect of the invention, a processor node of a network is provided which includes one or more processors and a virtualized channel adapter. The virtualized channel adapter is operable to reference a table to determine whether a destination of the communication is supported by the virtualized channel adapter. When the destination is supported for routing via hardware, the virtualized channel adapter is operable to route the communication via hardware to at least one of a physical port and a logical port of the virtualized channel adapter. Otherwise, when the destination is not supported for routing via hardware, the virtualized channel adapter is operable to route the communication via firmware to a virtual port of the virtualized channel adapter.

According to another aspect of the invention, a method is provided for routing a communication within a virtualized channel adapter to a destination. In such method, a table is referenced to determine whether a destination of the communication is supported by the virtualized channel adapter. When the destination is supported for routing via hardware, the communication is routed via hardware to at least one of a physical port and a logical port of the virtualized channel adapter. Otherwise, when the destination is not supported for routing via hardware, the communication is routed via firmware to a virtual port of the virtualized channel adapter.

According to a further aspect of the invention, a recording medium is provided having information recorded thereon for performing a method, the method corresponding to the foregoing described method according to an aspect of the invention.

DETAILED DESCRIPTION

Figure 1:
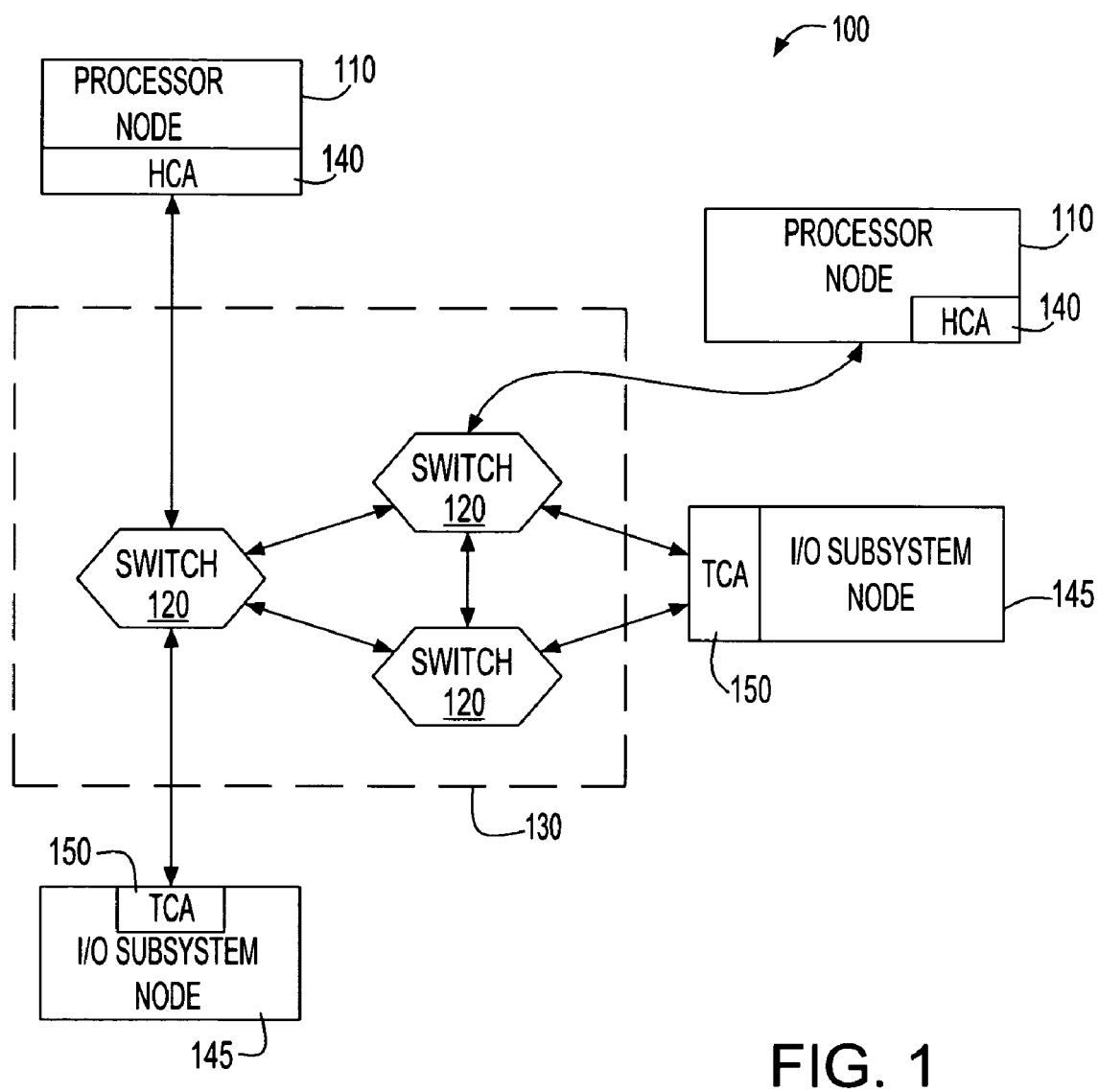
FIG. 1 is a diagram illustrating a system area network in accordance with one embodiment of the invention.

FIG. 1 is an illustration of a distributed computing system environment in accordance with InfiniBand architecture. While the embodiments of the invention are described herein in terms of a system area network ("SAN") using InfiniBand architecture ("IBA"), the present invention is not limited to use of IBA and can easily be other type of infrastructures such as for example implementations that provide remote computer system connection through the internet or an intranet. It is also possible to implement the workings of the present invention to a variety of different computing system environments ranging from those that are simple and comprised of one or a few nodes and operating system(s) to complex system environments with the infrastructure that support many nodes and operating systems.

As shown in FIG. 1, a collection of end nodes 110 are connected to one another through a switch fabric 130 to form a subnet. Each subnet must have at least one subnet manager (not shown) that is responsible for the configuration and management of the subnet. As further shown in FIG. 1, each node connects to the fabric through a channel adapter known as a host channel adapter ("HCA") 140 or a target channel adapter ("TCA") 150, in accordance with IBA. Each channel adapter can also have one or more than one ports (not illustrated). In addition, a channel adapter with more than one port may be connected to multiple ports in the fabric (not illustrated), such as multiple switch ports. This allows multiple paths to exist between a source and a destination in an effort to reduce congestion and improve performance. The arrangement also improves reliability in case of link failures. This arrangement also enables the ability to share storage devices, for example across multiple servers. I/O operations can also be performed between any two storage devices without direct involvement of the host server, therefore eliminating any unnecessary CPU utilization.

Figure 2:
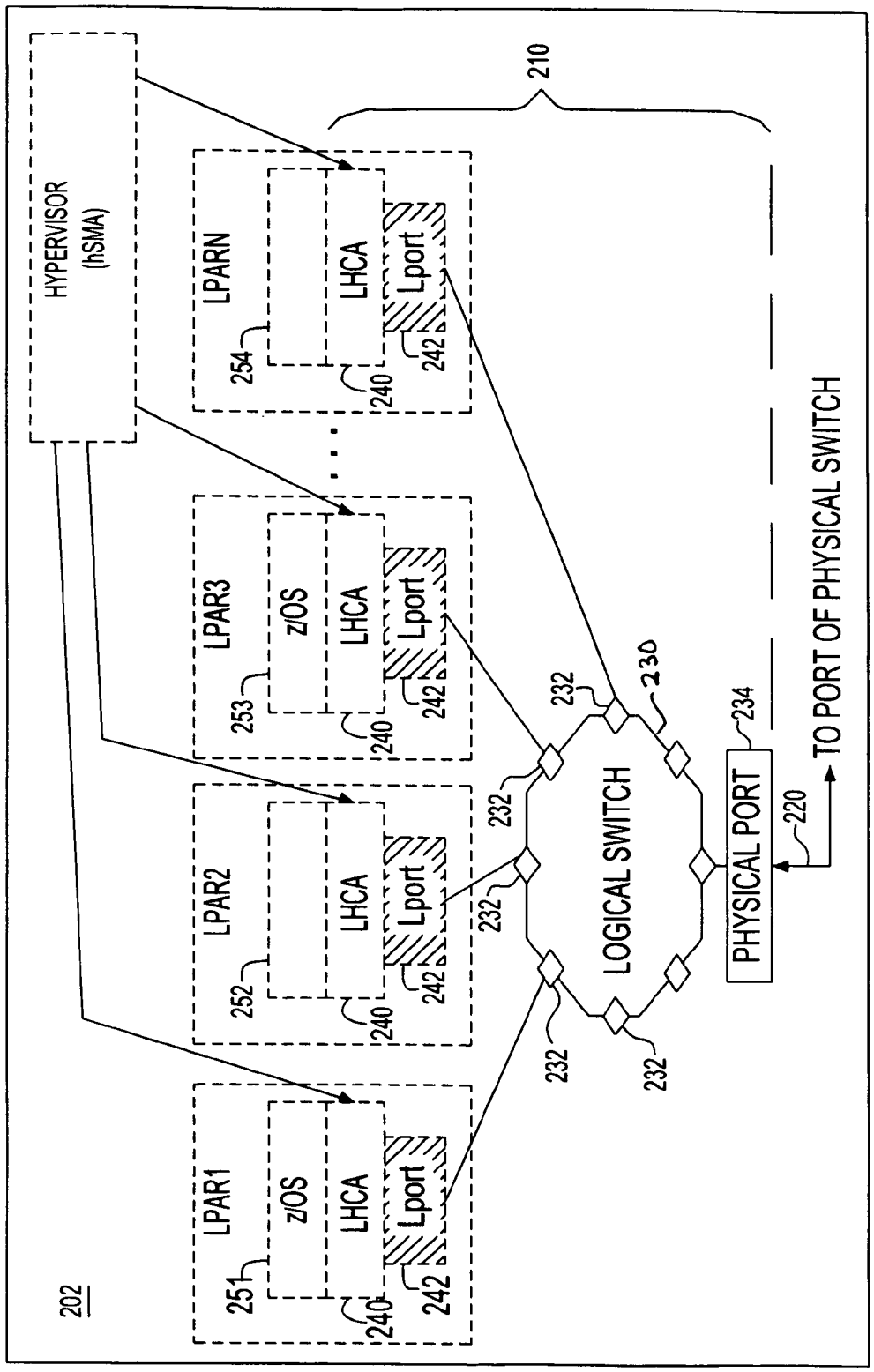
FIG. 2 is a block diagram illustrating an internal organization of a processor node in accordance with one embodiment of the invention.

FIG. 2 is a block and schematic diagram illustrating an arrangement of elements of an HCA 210 connecting one processor node 202 to a physical port of a physical switch 220 of an information processing system. Such arrangement is described in commonly owned U.S. patent application Ser. No. 10/441,448 filed Apr. 10, 2003, which was published as U.S. Patent Publication No. 2004/0202189 on Oct. 14, 2004. This application, which is not admitted prior art, is hereby incorporated by reference herein.

The HCA 210 includes hardware, firmware and software-supported elements. As physical hardware of the HCA 210, a physical port 234 supports communications to a port of a physical switch, as shown at 220. In addition, the HCA 210 includes a logical switch 230 and a plurality of logical ports 232, which expand the capabilities of the physical port 234 by enabling establishment of logical partitions connected to respective ones of the logical port. The logical switch and logical ports are desirably implemented via hardware state machines. The logical switch routes communications between respective ones of the logical ports, in addition to utilizing the resources of the physical port for communications between the processor node 202 and other elements of the SAN via a physical switch 220 of the SAN's switch fabric 130 (FIG. 1).

With the addition of the logical switch 230, the number of operating system instances that the HCA 210 is capable of supporting is not limited to the number of physical ports 234 that are present in the HCA 210. With the provision of the logical switch, the HCA 210 can be configured into a plurality of logical partitions LPAR1, LPAR2, LPAR3, . . . , LPARN, each capable of supporting an instance of an operating system. Within each logical partition, the instance of the operating system executed therein and applications thereon view the computing system (i.e., the processing and input output resources available to it) as being dedicated to that operating system and applications and do not have knowledge of other logical partitions of the system. Thus, each operating system instance and other parameters of each LPAR can be configured to provide a computing environment which is tailored to the particular use to which that computing environment is put.

In order for each LPAR to have an architecturally accurate view of the host channel adapter, an image of a logical host channel adapter ("LHCA") 240 is created for each LPAR which appears as being dedicated to a single LPAR. The LHCA 240 for each LPAR is configured to possess one or more logical ports ("L-ports") 242 which are attached to logical ports 232 of the logical switch 230. In turn, the logical switch 230 is connected to the physical port 234 of the HCA.

As described above, the HCA 210 includes a set of InfiniBand architected resources for queuing of entries related to communications traffic on each of its logical ports 232, such resources including work queue pairs, i.e., a pair of a send work queue and a receive work queue. Another such architected resource is a special queue pair ("QP0") set aside for recording and handling entries related to changes or events which affect the operation of the Infiniband subnet, and another special queue pair ("QP1") set aside for recording and handling InfiniBand architected general service interface ("GSI") entries. In accordance with Infiniband architecture, such queue pairs must always be designated as queue pairs "zero" and "one" or "QP0" and "QP1", respectively. In addition to these architecturally designated resources, other architected resources including additional queue pairs for managing communications between LHCAs and resources which are not architected by IBA such as event queues which are utilized in each LHCA in support of the LPAR.

Each LHCA 240 supports execution of one operating system image. Collectively, the LHCAs 240 depicted in FIG. 2 support the execution of the operating system images 251, 252, 253, and 254. Each operating system image is an instance of an operating system, for example, z/OS®, LINUX, AIX®, UNIX®, VM™, and MVS™ (z/OS, AIX, VM and MVS are trademarks or registered trademarks of International Business Machines Corporation, and UNIX is a registered trademark of Unix System Laboratories, Inc.) or other operating system. Each such operating system, which is executed in one logical partition ("LPAR") of the processor node, is supported by one of the LHCAs. For each operating system image, either the same or different operating systems can be executed. In the particular implementation shown, some of the operating system images are instances of one particular operating system, and other operating system images are instances of another particular operating system. Specifically, two (251, 253) of the operating system images are z/OS operating system images and two others (252, 254) of the operating system images are LINUX operating system images.

In the HCA 210 implemented in accordance with FIG. 2, the number of operating system images that can be supported by the HCA correspond to the number of logical ports or "L-ports" 232 the logical switch 230 is configured to support.

For example, a logical switch 230 of a host may support a maximum of 253 logical ports (232). As mentioned above, the logical switch may be implemented in hardware, e.g., via hardware state machines. Thus, in this example, without making a change in the hardware, the number of logical partitions that can be supported by a physical port 234 of the HCA is limited to the number of supported logical ports, i.e., 253.

It is frequently desirable for an information handling system to support a greater number of operating system images than the maximum number supported by a logical switch. Moreover, the HCA frequently has enough resources to support a greater number of operating system images than those supported by a logical switch. For these reasons and others, a facility is provided by which a communication port of a communication interface is configured as a plurality of virtual ports, each capable of supporting a logical partition of the host on which one or more operating system images is executed.

Accordingly in a more particular embodiment of the invention, a way is provided of increasing the number of logical partitions that can be supported on a processor node of a SAN, without being limited to a number of logical ports of a pre-existing logical switch whether implemented in hardware or otherwise. Thus, as described in the following, the number of supported logical partitions is increased up to a maximum that is constrained only to the extent of resources allocated thereto and supported by firmware. By increasing the number of logical partitions that are supported by one processor node, the computing and I/O resources of the processor node can be configured support a large number of potentially different environments, each of which can be customized to a particular customer's needs. This, in turn, can help to lower the total cost of meeting the customer's computing needs because the resources of the server can be utilized effectively to provide large numbers of operating system images in a corresponding large number of environments tailored to the customer's needs.

Accordingly, processor nodes of a system area network can be logically partitioned to a much greater degree than that permitted before. By enabling processor nodes to operate with a large number of logical partitions supporting potentially different requirements, a processor node can support a greater number of different computing environments supported by operating system images in different logical partitions. This supports a greater degree of pooling, central planning and management of resources by processor monitoring systems and professional system administrators. These considerations lower the total cost of providing the different computing environments to a point lower than that of owning and separately maintaining individual and separate computing system hardware for each environment.

Figure 3:
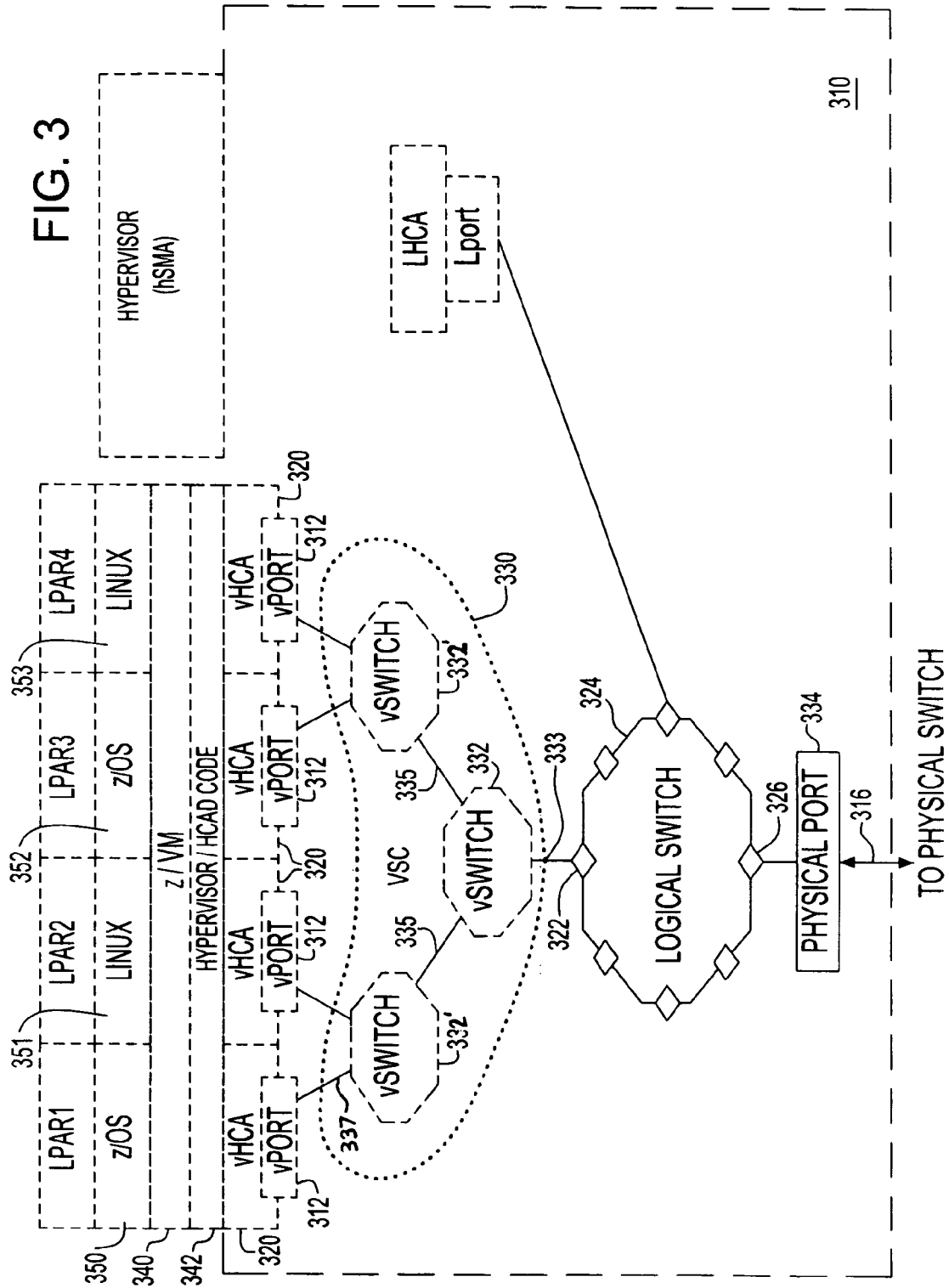
FIG. 3 is a block diagram illustrating an internal organization of a processor node in accordance with a particular preferred embodiment of the invention.

FIG. 3 is a diagram illustrating an arrangement according to an embodiment of the invention. In this arrangement, a virtualized HCA 310 supports communications of a number of operating system images 350, 351, 352, and 353 which are executed on a processor node of an information handling system. One particular system area network in accordance with a preferred embodiment is shown and described below with reference to FIG. 5. As in the system area network 100 (FIG. 1) described above, each processor node of the system may include one or more processors. Each processor node is operable to execute multiple operating system images in multiple logical partitions ("LPARs") resident on the processor node.

In an extension of the arrangement shown and described with reference to FIG. 2 above, the virtual HCA 310 shown in FIG. 3 includes a number of virtual ports 312 which are connected to a physical port 334 of the HCA 310 by way of a logical switch 324. The logical switch is part of the firmware managed configuration of the HCA 310. According to this embodiment, the number of operating system images that can be supported by the virtualized HCA 310 are not limited to the number of available logical ports of a logical switch 324, as they are in the arrangement shown in FIG. 2. Rather, the number of supported operating system images is limited only by the number of virtual port images that the HCA adapter hardware is capable of supporting, based on the amount of available resources that the HCA adapter hardware has.

"z/VM"® is used to refer to a particular operating system designed to operate on large scale computing systems, especially those which are sold under the mark zSeries® (registered trademarks of International Business Machines Corporation). z/VM has a special characteristic of being usable as a "first-level" operating system 340 capable of supporting a plurality of second-level operating systems images of a processor node of the SAN. In this embodiment, z/VM is used as a first-level operating system supporting the execution of a plurality of second level operating system images, i.e., z/OS images 350, 352 and Linux images 351 and 353. The z/VM operating system 340 executes above a layer of code in which the hypervisor resides. The hypervisor is a set of code for controlling the allocation of resources, e.g., access to certain tables and operating system spaces within memory, as well as the communication resources, e.g., ports and queue pairs of the HCA. The hypervisor has higher privileges than any operating system on the processor node. This permits the hypervisor to allocate resources to respective LPARs of the processor node in way that prevents allocations to different LPARs from conflicting.

The virtualized HCA 310 shown in FIG. 3 includes a plurality of virtual HCAs ("vHCA") 320. Herein, the term "virtualized" HCA is used to refer to a physical HCA which has been configured to support a number of virtual ports or "vPorts" 312. By contrast, the term "virtual HCA" or "vHCA" 320 is used to refer to a virtual image of the HCA which supports communications required by a particular operating system image, e.g., z/OS image 350 which is executed in a particular logical partition ("LPAR1") of the processor node.

As shown in FIG. 3, the vHCAs 320 of the HCA 310 have respective vPorts 312 which allow the vHCAs to send and receive communications, e.g., messages, over a plurality of respective activatable logical links to a virtual switch cluster ("VSC") 330. In turn, the VSC 330 has one or more logical links connected to one or more logical ports 322 of a logical switch 324. In the embodiment shown in FIG. 3, the VSC includes three virtual switches. One virtual switch 332 supports communications through a logical link 333 connected to a logical port 322 of the logical switch 324, which, in turn has a logical link to a physical port 334 of the HCA adapter hardware. The physical port has a physical link 316 to a port of a physical switch of a switch fabric which supports inter-host communications. In the particular arrangement shown in FIG. 3, two other virtual switches 332' support communications by way of logical links 335 to and from the one virtual switch 332 that is connected to the logical switch 324. These two other virtual switches 332' support communications through logical links 337 to the virtual ports 312 of the vHCAs for the respective operating system images that reside on the processor node 110.

While only a few virtual ports are illustrated in the particular example shown in FIG. 3, the virtualized HCA can be configured to support any number of virtual ports up to the limit that the available adapter resources can support. In addition, the number of virtual switches 332 and 332' that appear in each virtual switch cluster 330 varies according the number of virtual ports supported by the virtualized HCA 310. By way of example, if the HCA has capabilities to support one thousand virtual ports, and each virtual switch 332 and 332' can support communications up to some maximum number of virtual ports, for example, 253 virtual ports, then there needs to be at least four of the virtual switches 332' which connect to the virtual ports 312 which support the respective vHCAs, and one additional virtual switch 332 connected via logical links 335 to the four virtual switches 332', for connection to logical port 322 of logical switch 324.

Figure 4:
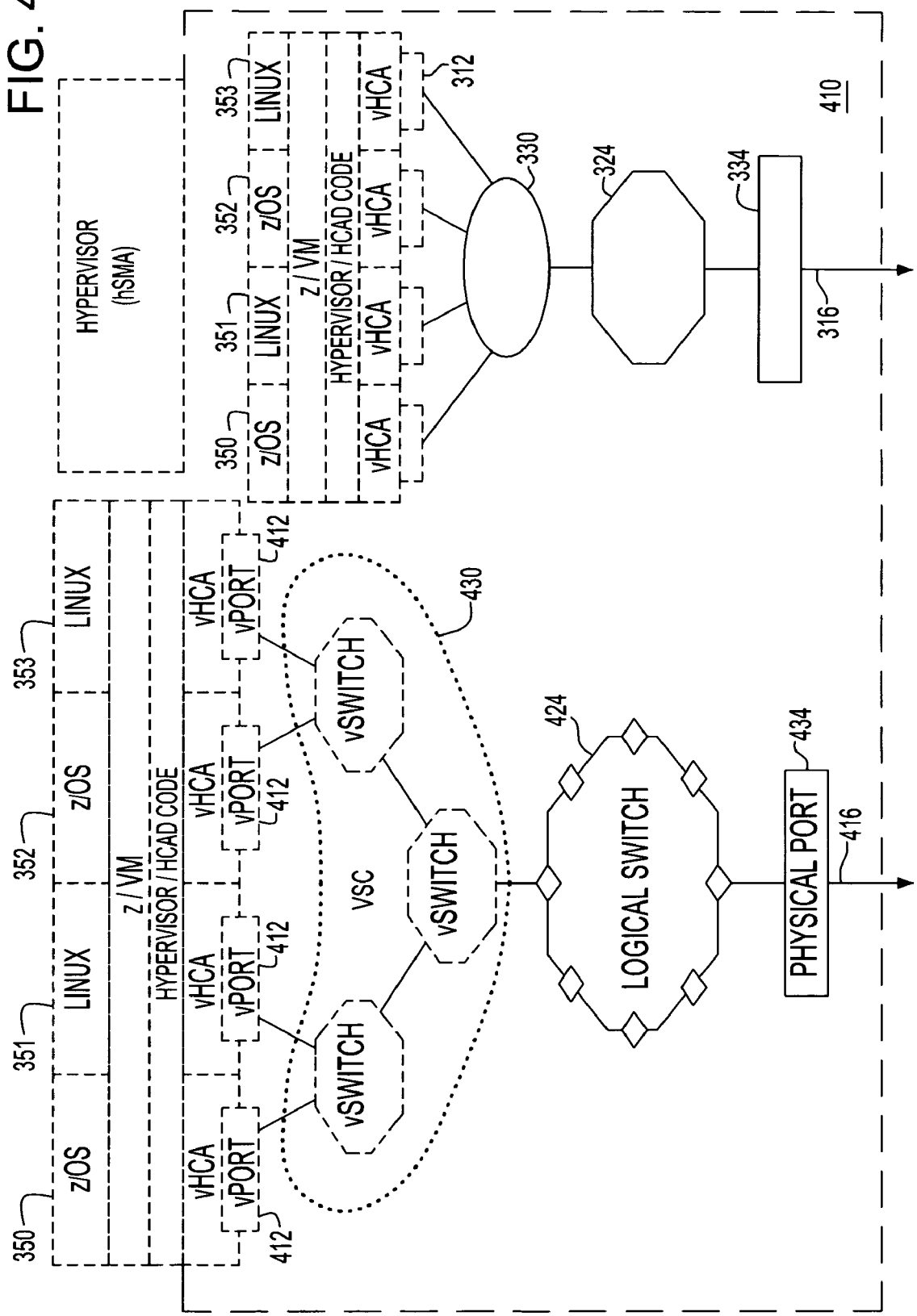
FIG. 4 is a block diagram illustrating an internal organization of a processor node in accordance with another particular preferred embodiment of the invention.

In a particular arrangement shown in FIG. 4, the operating system images 350, 351, 352, and 353 are not limited to each being capable of communicating through only one virtual port 312, one virtual switch cluster 330 and one logical switch 324, and one physical port 334 of the HCA, which are those shown and described above relative to FIG. 3. In addition to these primary network communications links, it is desirable to provide support for additional communications links for each of the operating system images, in case of failure of any of the ports and/or logical links which connect the operating system images to the final link 316 to the switch fabric. Accordingly, in the virtualized HCA 410 shown in FIG. 4, the same operating system images 350, 351, 352, and 353 are also provided additional activatable communication capabilities to a different physical port 434 having a different logical link 416 to the switch fabric. The additional communication capabilities are provided through additional virtual ports 412, as well as by logical links through another virtual switch cluster 430 having characteristics similar to that described above of virtual switch cluster 330, and through another logical switch 424 similar to logical port 324. In this case, at least some of the additional logical links from some of the virtual ports 412 of some vHCAs supporting operating system images need not be activated until the additional logical links are required to be used, i.e., such as in the case of a failure of a logical link or other resource which supports communication along the primary network communications links.

Figure 5:
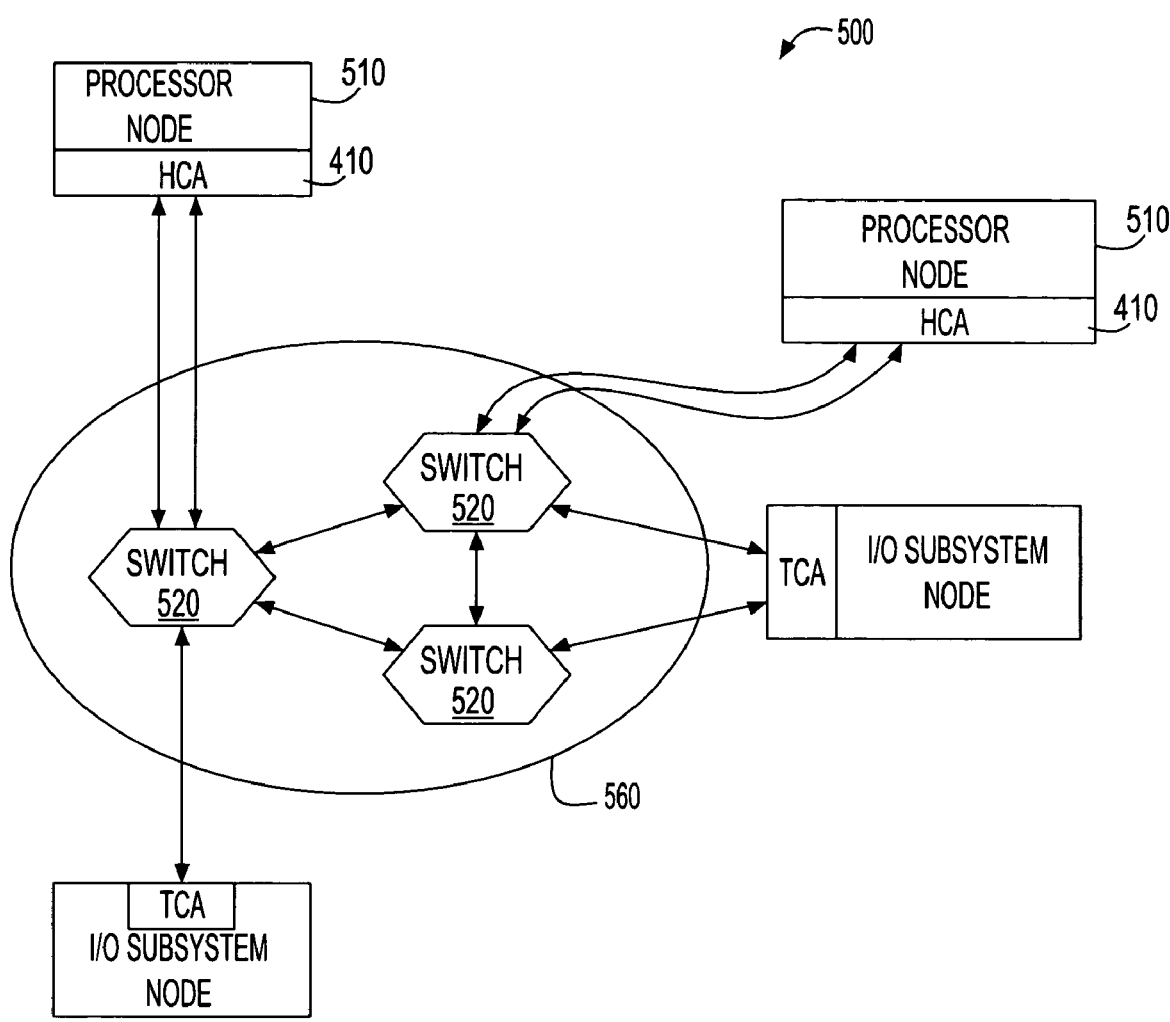
FIG. 5 is a diagram illustrating a system area network in accordance with the embodiment of the invention illustrated in FIG. 4.

FIG. 5 illustrates a system area network 500 according to a preferred implementation of the invention, which utilizes the virtualized HCA 410 shown in FIG. 4. Accordingly, a virtualized HCA supporting each processor node 510 has communication paths through at least two different physical ports to a switch 520 of the switch fabric 560 supporting the system area network. Taken together with the preferred network topology described above relative to FIG. 4, each communication path via each physical port to the switch fabric 560 supports potentially activatable logical links between each of a plurality of operating system images utilizing respective vHCAs of the system area network 500 and the switch fabric.

The vHCAs are used in the following manner. In order for an application to communicate with another application over the SAN, the application must first be allocated a queue pair (QP) that consists of a send work queue and a receive work queue. To execute a communication operation, the application must then place a work queue element ("WQE") in the send work queue. An example of such communication operation is the sending and receiving of a message containing one or more packets between respective processor nodes of the SAN. After the WQE has been placed in the send work queue, the communication operation is picked up for handling by the HCA. In this way, the QP forms the communications medium between applications and the HCA, thus relieving the operating system from having to deal with this responsibility. Each process may create one or more QPs for communications purposes with other applications. In such manner, IBA provides a message passing mechanism that can be used for I/O devices and interprocess communications between HCAs 210.

Processes, e.g., applications executing on processor nodes and devices can thus utilize the message passing interface of the HCA by posting send and receive WQEs to the send work queue and the receive work queue of a respective vPort of the HCA. As mentioned above, these processes are referred to as "consumers." A consumer can be defined as a direct user of verbs. Verbs are abstract descriptions of the functionality of a channel adapter. Consumers subsequently receive the results of handled WQEs as completion queue elements (CQE) posted to completion queues (CQs).

One feature of a processor node which assists the hypervisor 340 in properly allocating resources, e.g., QPs and CQs, to respective logical partitions is that identifiers for all QPs come from the same name space. For example, when there are "n" virtual, logical or physical ports configured on the HCA, all of the QPs available on a processor node for use as work queue pairs and completion queue pairs are numbered consecutively from QP2 to QPm. In this case, m is greater than or equal to some defined number that is greater than n, and QPm is the highest numbered QP available in the processor node. In this way, the hypervisor has no doubt about the identities and allocations of particular QPs to target virtual entities, i.e., vHCAs when the hypervisor creates and updates allocations to respective LPARs of the processor node.

However, there is an exception to this general rule. Each vHCA must own one queue pair identified as QP0 and must own one queue pair identified as QP1. The queue pair QP0 is a place for posting WQEs for action relating to subnet management. WQEs on this queue pair typically relate to general concerns of the LPAR or processor node and/or HCA. On the other hand, the queue pair QP1 is a place for posting WQEs relating to general service messages, i.e., as a general service interface ("GSI"). This requirement poses a difficulty in that the QP0 and QP1 of each respective LPAR must be drawn from the general pool of QPs numbered from QP2 to QPm. Accordingly, a facility is provided in firmware by which queue pairs are drawn from the general pool of QPs and are assigned to each LPAR as an "alias QP0" and an "alias QP1". In such case, each LPAR references these queue pairs as "QP0" and "QP1". However, among the resources of the physical HCA, these queue pairs continue to be identified by their original queue pair numbers. The firmware assignment of alias QP identifiers allows the firmware to intercept communications that are bound for virtual HCA destinations such as LID x, QP0, and direct them to the correct queue pair of the set of consecutively numbered QPs of the HCA.

However, at first a new facility, preferably implemented in hardware, is used to determine whether a particular logical or virtual port to which a communication is addressed is supported by the virtualized HCA configuration. Once that determination is made, HCA hardware determines whether the addressed destination corresponds to a logical port of a logical switch. If so, the hardware routes the communication to the addressed logical port. However, when the HCA hardware determines that the addressed destination does not correspond to a logical port of a logical switch, the system firmware handles forwarding the communication to the addressed virtual port of the HCA.

Figure 6:
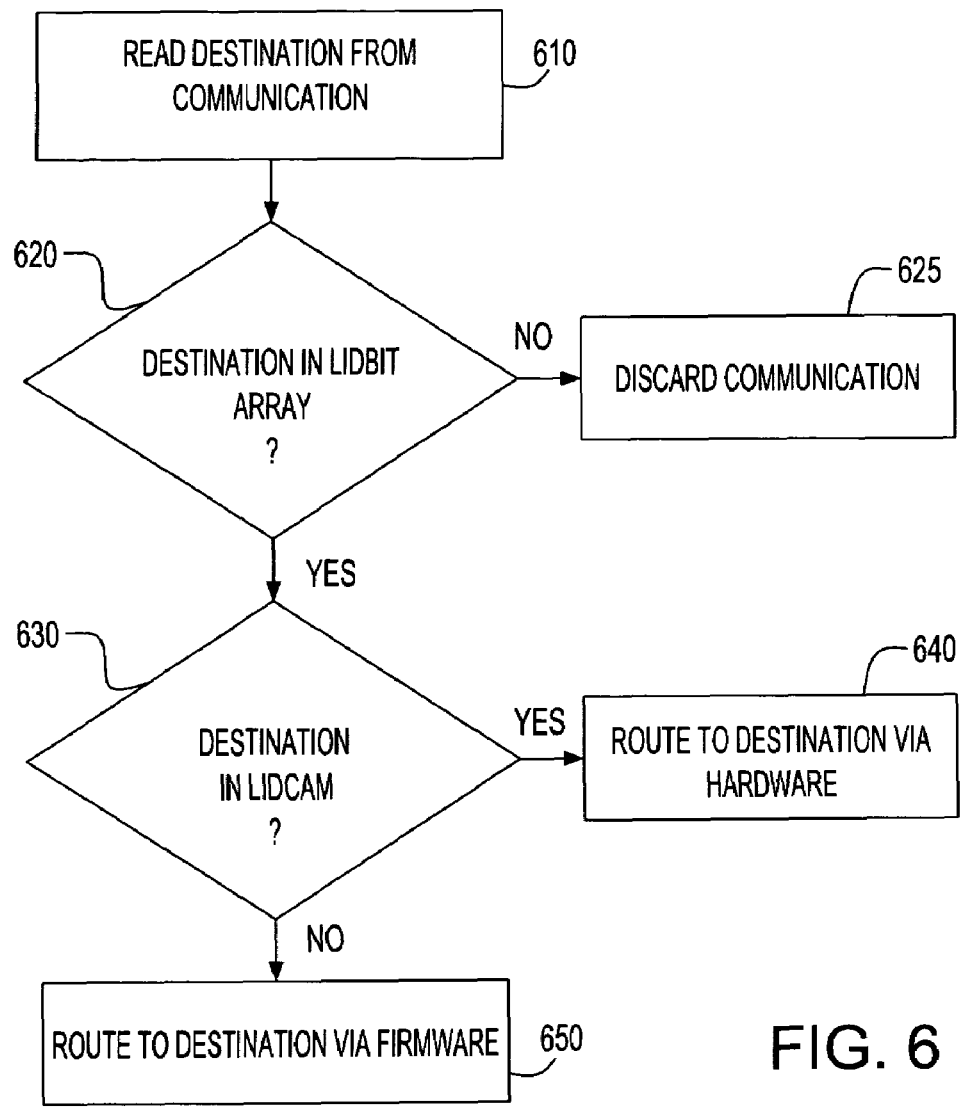
FIG. 6 is a flow diagram illustrating a method of routing a communication within a virtualized channel adapter in accordance with one embodiment of the invention.

This method is best illustrated with reference to FIG. 6. As shown therein, in step 610 the HCA adapter hardware reads the destination address from the header of the communication arriving at the HCA. In order for the HCA to route the communication to a destination supported by the HCA, the destination address must correspond to a "local identifier" or ("LID") which uniquely identifies a physical port, a logical port or a virtual port of the HCA. The communication arrives from either one of the vHCAs or LHCAs supported by the virtualized HCA or from another processor node over the switch fabric. Thereafter, in step 620, the HCA hardware checks a table in the HCA hardware, referred to as a LID bit array, to determine whether the LID exists and is supported by the HCA.

Figure 7:
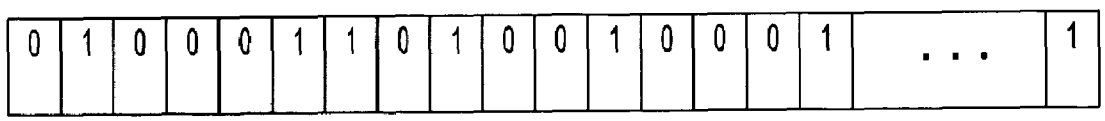
FIG. 7 is a block diagram illustrating a LID bit array utilized in accordance with a particular embodiment of the invention.

The LID bit array has a structure as shown in FIG. 7, for example. The LID bit array includes a one bit indicator representing whether each LID is supported or not. The position of each bit within the LID bit array corresponds to the numerical identifier of the LID. That is, a particular LID is supported by the HCA when the position of the LID bit array corresponding to the particular LID is filled by a "1". On the other hand, when the position of the LID bit array corresponding to the particular LID is filled by a "0", this indicates that the LID is not supported on the HCA. Initially, the bits of the LID bit array are set to zero. When a vHCA of virtualized configuration is assigned an LID by the subnet manager, the corresponding bit in the LID bit array is set to one.

Of course, in an alternative implementation, these conventions can be reversed, so that the LID bit array indicates that the LID is supported by the HCA when a particular LID position of the array is filled by a "0" and indicates that the LID is not supported when the particular LID position of the array is filled by a "1". When a vHCA 320 (FIG. 3) of the configuration is assigned a LID by the subnet manager (not shown), the corresponding bit in the LID bit array is set to "1", and The system firmware then associates the particular QPs allocated to the vHCA with the LID. In a particular embodiment, the number of positions within the array corresponds to a maximum number of unicast type LIDs in an HCA, as specified in accordance with IBA. In the embodiment shown in FIG. 7, the LID bit array includes positions representing the status of each of 49152 potentially different LIDs of the HCA.

When the LID bit array indicates that the LID is not supported by the HCA, the HCA hardware ignores or discards the communication (step 625). Depending on the type of messaging protocol being used, the HCA may do nothing else, or it may post a WQE to a send work queue to indicates that a misdirected communication was received. Otherwise, the HCA may post an event to an event queue (EQ) to indicate that the misdirected communication arrived at the HCA.

When the LID bit array indicates that the LID is supported by the HCA, at step 630 the HCA hardware then determines whether the destination appears in a table of the HCA referred to as a LIDCAM. The LIDCAM is an entry point to a decoder of destination addresses. Once the LIDCAM identifies that the destination is supported therein, in step 640 the hardware then routes the communication to the destination. However, when the LIDCAM is unable to identify the destination, in step 650, firmware then routes the communication to the QP that the hypervisor has allocated for receipt of the communications by the VHCA associated with the LID.

As described above, special handling is required for the case of directing communications to the particular queue pairs assigned to each LPAR as QP0 and QP1. Since all LPARs require queue pairs numbered QP0 and QP1, a hardware facility is provided by which all communications destination for QP0 for a particular virtual port x of the vHCAs are directed to an alias queue pair. In addition, all communications destined for QP1 for a particular virtual port x of the vHCAs are directed to another alias queue pair. Once the firmware has decoded the destination in a header field of the communication, communications addressed to QP0 or QP1 queue pairs are directed to the correct queue pair for each LPAR. In a particular embodiment, the HCA is virtualized to one in which a number "n" virtual ports are supported, and, therefore, the number "2n" of queue pairs are reserved by the system firmware. A QP numbered QP2(x−1) is used as the single special queue pair for receiving all communications destined for QP0 for a port "x" of any of the virtual HCAs associated with the physical HCA. Similarly, QP2(x−1)+1 is used to receive all communications destined for QP1 for a port "x" of the virtual HCAs associated with the physical HCA.

Therefore, in an example where there are 1000 ports, i.e., "n" is equal to 1000, ports are numbered from 1 to 1000, and 2000 queue pairs are numbered from 0 to 1999, as reserved by the system firmware. Here, an example is provided in which a virtual port "x" is the virtual port 1000. In such case, QP1998 (i.e. 2 times 999) is used to receive all communications destined for QP0 for virtual port 1000 of the virtual HCAs associated with the physical HCA. Similarly, QP1999 is used to receive all communication for QP1 for virtual port 1000 of the virtual HCAs associated with the physical HCA. Thus, in this example, the queue pairs assigned as the alias queue pairs QP0 and QP1 to each LPAR are assigned in a consistent manner from the end of the range of queue pairs downward. By assigning the alias queue pairs to respective LPARs in this manner, the hypervisor can consistently reserve the number of queue pairs at the end of the range that are needed for allocation as alias queue pairs. Thus, the job of the hypervisor is made easier for determining the number of available queue pairs after subtraction of the queue pairs reserved as alias queue pairs.

It is important to note that while the present invention has been described in the context of a data processing system, that methods in accordance with the present invention are capable of being distributed in the form of information recorded on a recording medium for performing such methods in a variety of forms and that the claims appended below to such recording medium apply equally regardless of the particular type of recording medium actually used to carry out the distribution. Examples of recording media include, but are not limited to fixed and removable media such as magnetic and magneto-optic disks, optical discs, random access memories ("RAMs"), read only memories ("ROMs"), and transmission media such as electronic distribution networks, whether such networks utilize wired, wireless, optical or some other form of transmission along links thereof.

While the invention has been described with reference to certain preferred embodiments thereof, those skilled in the art will understand the many modifications and enhancements which can be made without departing from the true scope and spirit of the invention, which is limited only by the appended claims.

What is claimed is:

1. A processor node of a network, comprising:
   one or more processors; and
   a virtualized channel adapter, the virtualized channel adapter operable to reference a table to determine whether a destination of a communication is supported by the virtualized channel adapter;
   when the destination is supported for routing via hardware, the virtualized channel adapter being operable to route the communication via hardware to at least one of a physical port and a logical port of the virtualized channel adapter; and
   when the destination is not supported for routing via hardware, the virtualized channel adapter being operable to route the communication via firmware to a virtual port of the virtualized channel adapter, the virtualized channel adapter being further operable to assign a first queue pair and a second queue pair to a logical partition (LPAR), the first queue pair being assigned for use as a queue pair QP0 for recording and handling Changes or events affecting the operation of a subnet, and the second queue pair being assigned for use as a queue pair QP1 for recording and handling architected general service interface (GSI) entries, the first and second queue pairs being assigned from a pool of physical queue pairs allocated to the virtualized channel adapter and having arbitrary physical queue pair numbers, the first and second queue pairs being assigned an alias QP0 identifier and an alias QP1 identifier, respectively.

2. The processor node as claimed in claim 1, wherein the table includes an array of bits, each bit indicating whether a local identifier ("LID") is supported by the virtualized channel adapter, such that the destination is supported by the virtualized channel adapter when the destination corresponds to a LID indicated by the array to be supported.

3. The processor node as claimed in claim 2, wherein the virtualized channel adapter is operable to determine whether the destination is supported by hardware by checking the destination via a LIDCAM facility, being an entry point to a decoder of destination addresses of the virtualized channel adapter.

4. The processor node as claimed in claim 1, wherein the first and second queue pairs are assigned from an end of a range of queue pair numbers of the virtualized channel adapter.

5. The processor node as claimed in claim 4, wherein the queue pair QP0 is assigned to a particular LPAR utilizing a particular virtual port numbered "x" using a queue pair of the virtualized channel adapter numbered QP2(x−1).

6. The processor node as claimed in claim 4, wherein the queue pair QP1 is assigned to a particular LPAR utilizing a particular virtual port numbered "x" using a queue pair of the virtualized channel adapter numbered QP2(x−1)+1.

7. A method of routing a communication within a virtualized channel adapter to a destination, comprising:
    referencing a table to determine whether a destination of the communication is supported by the virtualized channel adapter;
    when the destination is supported for routing via hardware, routing the communication via hardware to at least one of a physical port and a logical port of the virtualized channel adapter;
    when the destination is not supported for routing via hardware, routing the communication via firmware to a virtual port of the virtualized channel adapter,
    and assigning a first queue pair and a second queue pair to a logical partition (LPAR), the first queue pair being assigned for use as a queue pair QP0 for recording and handling changes or events affecting the operation of a subnet, and the second queue pair being assigned for use as a queue pair QP1 for recording and handling architected general service interface (GSI) entries, the first and second queue pairs being assigned from a pool of physical queue pairs allocated to the virtualized channel adapter and having arbitrary physical, queue pair numbers, the first and second queue pairs being assigned an alias QP0 identifier and an alias QP1 identifier, respectively.

8. The method as claimed in claim 7, wherein the table includes an array of bits, each bit indicating whether a local identifier ("LID") is supported by the virtualized channel adapter, such that the destination is supported by the virtualized channel adapter when the destination corresponds to a LID indicated by the array to be supported.

9. The method as claimed in claim 8, wherein a determination is made whether the destination is supported by hardware by checking the destination via a LIDCAM facility, being an entry point to a decoder of destination addresses of the virtualized channel adapter.

10. The method as claimed in claim 7, wherein the first and second queue pairs are assigned from an end of a range of queue pair numbers the virtualized channel adapter.

11. The method as claimed in claim 10, wherein the queue pair QP0 is assigned to a particular LPAR utilizing a particular virtual port numbered "x" using a queue pair of the virtualized channel adapter numbered QP2(x−1).

12. The method as claimed in claim 10, wherein the queue pair QP1 is assigned to a particular LPAR utilizing a particular virtual port numbered "x" using a queue pair of the virtualized channel adapter numbered QP2(x−1)+1.

13. A recording medium having information recorded thereon for performing a method for routing a communication within a virtualized channel adapter to a destination, the method comprising:
    referencing a table to determine whether a destination of the communication is supported by the virtualized channel adapter;
    when the destination is supported for routing via hardware, routing the communication via hardware to at least one of a physical port and a logical port of the virtualized channel adapter;
    when the destination is not supported for routing via hardware, routing the communication via firmware to a virtual port of the virtualized channel adapter,
    and assigning a first queue pair and a second queue pair to a logical partition (LPAR), the first queue pair being assigned for use as a queue pair QP0 for recording and handling changes or events affecting the operation of a subnet, and the second queue pair being assigned for use as a queue pair QP1 for recording and handling architected general service interface (GSI) entries, the first and second queue pairs being assigned fr6md pool of physical queue pairs allocated to the virtualized channel adapter and having arbitrary physical queue pair numbers, the first and second queue pairs being assigned an alias QP0 identifier and an alias QP1 identifier, respectively.

14. The recording medium as claimed in claim 13, wherein the table includes an array of bits, each bit indicating whether a local identifier ("LID") is supported by the virtualized channel adapter, such that the destination is supported by the virtualized channel adapter when the destination corresponds to a LID indicated by the array to be supported.

15. The recording medium as claimed in claim 14, wherein a determination is made whether the destination is supported by hardware by checking the destination via a LIDCAM facility, being an entry point to a decoder of destination addresses of the virtualized channel adapter.

16. The recording medium as claimed in claim 13, wherein the first and second queue pairs are assigned from an end of a range of queue pair numbers of the virtualized channel adapter.

17. The recording medium as claimed in claim 16, wherein the queue pair QP0 is assigned to a particular LPAR utilizing a particular virtual port numbered "x" using a queue pair of the virtualized channel adapter numbered QP2(x−1).

* * * * *

UNITED STATES PATENT AND TRADEMARK OFFICE
CERTIFICATE OF CORRECTION

PATENT NO. : 7,581,021 B2 Page 1 of 1
APPLICATION NO. : 11/100846
DATED : August 25, 2009
INVENTOR(S) : Errickson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1171 days.

Signed and Sealed this

Fourteenth Day of September, 2010

David J. Kappos
*Director of the United States Patent and Trademark Office*